United States Patent
Wang et al.

(10) Patent No.: US 10,219,274 B2
(45) Date of Patent: Feb. 26, 2019

(54) CHANNEL BONDING OPERATIONS IN WIRELESS COMMUNICATIONS

(71) Applicant: Marvell World Trade Ltd., St. Michael (BB)

(72) Inventors: Lei Wang, San Diego, CA (US); Hongyuan Zhang, Fremont, CA (US); Yakun Sun, Sunnyvale, CA (US); Liwen Chu, San Ramon, CA (US); Jinjing Jiang, San Jose, CA (US); Yan Zhang, Palo Alto, CA (US); Hui-Ling Lou, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 338 days.

(21) Appl. No.: 15/135,428

(22) Filed: Apr. 21, 2016

(65) Prior Publication Data

US 2016/0316473 A1    Oct. 27, 2016

Related U.S. Application Data

(60) Provisional application No. 62/151,938, filed on Apr. 23, 2015, provisional application No. 62/297,242, filed on Feb. 19, 2016.

(51) Int. Cl.
*H04W 72/04*    (2009.01)
*H04W 74/08*    (2009.01)
(Continued)

(52) U.S. Cl.
CPC ....... *H04W 72/0453* (2013.01); *H04W 24/02* (2013.01); *H04W 24/08* (2013.01);
(Continued)

(58) Field of Classification Search
None
See application file for complete search history.

(56) References Cited

U.S. PATENT DOCUMENTS

2005/0136933 A1    6/2005 Sandhu
2009/0135713 A1*   5/2009 Hwang ................ H04L 5/0037
                                                           370/210
(Continued)

OTHER PUBLICATIONS

International Application No. PCT/IB2016/052285, Notification of Transmittal of the International Search Report and the Written Opinion of the International Searching Authority, dated Jul. 25, 2016, 13 pages.

*Primary Examiner* — Rebecca E Song

(57) ABSTRACT

Systems and techniques relating to wireless communications are described. A described technique includes sensing a group of channels for a channel contention operation that acquires two or more channels of the group of channels and detects a busy channel of the group of channels; determining a channel bonding indicator based on the channel contention operation; generating a preamble portion of a frame that includes the channel bonding indicator; generating a data portion of the frame, and transmitting the frame to one or more devices. Generating the preamble portion can include duplicating a legacy preamble on each of the acquired channels within the preamble portion. Generating the data portion can include setting first subcarriers that correspond to the acquired channels to data values, and setting second subcarriers that correspond to the busy channel to null values for at least a portion of the data portion of the frame.

20 Claims, 14 Drawing Sheets

(51) Int. Cl.
 *H04W 24/02* (2009.01)
 *H04W 24/08* (2009.01)
 H04W 72/08 (2009.01)
 H04W 84/12 (2009.01)

(52) U.S. Cl.
 CPC ... *H04W 72/0446* (2013.01); *H04W 74/0816* (2013.01); *H04W 72/082* (2013.01); *H04W 84/12* (2013.01)

(56) References Cited

U.S. PATENT DOCUMENTS

| | | |
|---|---|---|
| 2010/0260159 A1 | 10/2010 | Zhang |
| 2012/0082045 A1 | 4/2012 | Liu |
| 2014/0269608 A1* | 9/2014 | Jung ................. H04L 5/001 370/330 |
| 2016/0149683 A1* | 5/2016 | Huang ............... H04L 5/0053 370/329 |

* cited by examiner

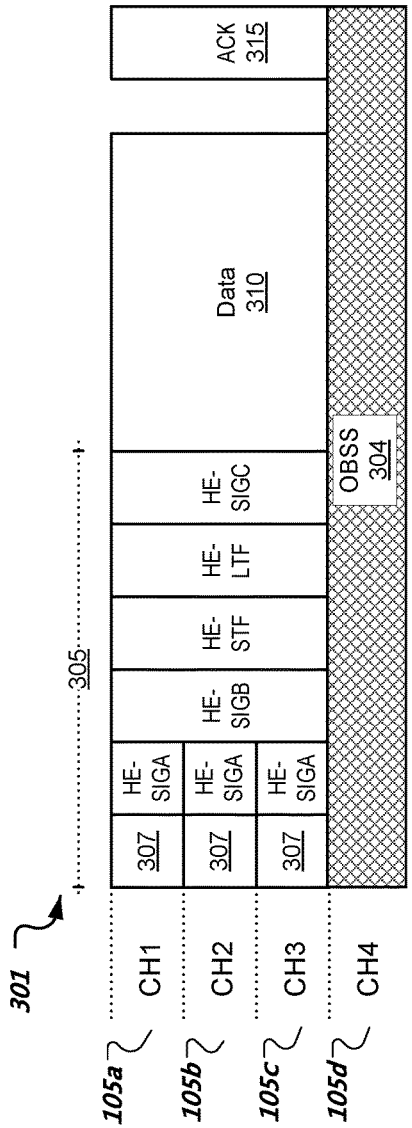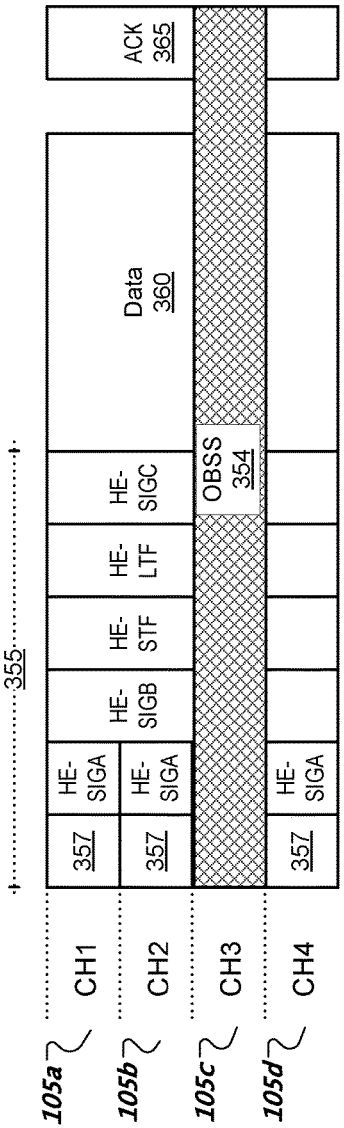

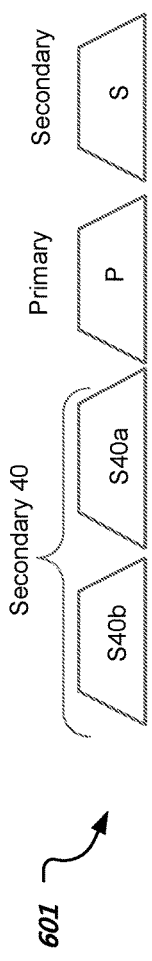
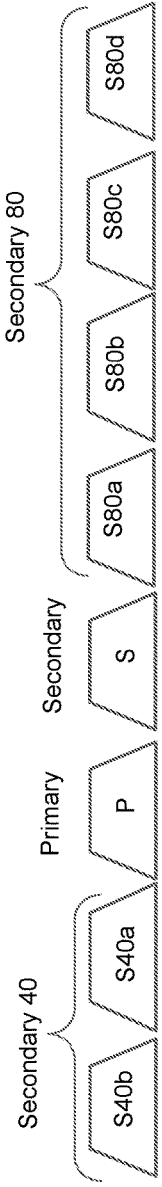
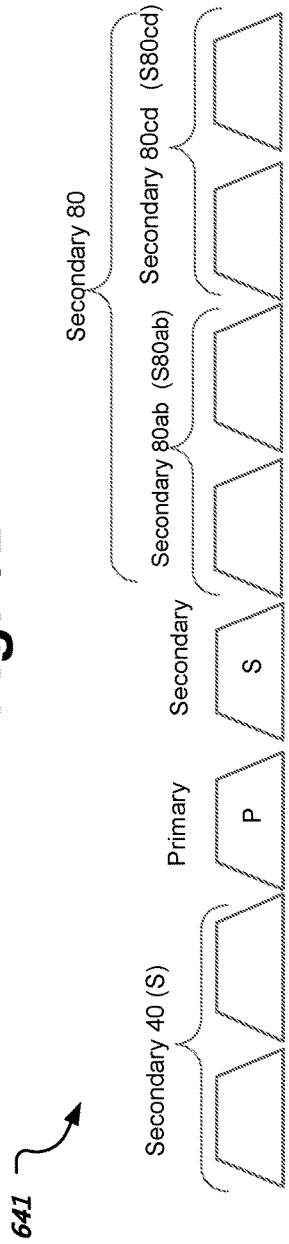
Fig. 6A
Fig. 6B
Fig. 6C

| S40b | S40a | P | S | Operation channel | PHY-CCA.indication |
|---|---|---|---|---|---|
| X | X | B | X | No channel access | PHY-CCA.indication(BUSY, {P}) |
| B | B | A | B | 20MHz (existing 20MHz operation) | PHY-CCA.indication(BUSY, {S, S40a, S40b}) |
| A | B | A | B | 20+20 non-continuous bonding | PHY-CCA.indication(BUSY, {S, S40a}) |
| B | A | A | B | 40 continuous bonding | PHY-CCA.indication(BUSY, {S, S40b}) |
| A | A | A | B | 60 continuous bonding | PHY-CCA.indication(BUSY, {S}) |
| B | B | A | A | 40MHz (existing 40MHz operation) | PHY-CCA.indication(BUSY, {S40a, S40b}) |
| A | B | A | A | 40+20 MHz non-continuous bonding | PHY-CCA.indication(BUSY, {S40a}) |
| B | A | A | A | 60MHz continuous bonding | PHY-CCA.indication(BUSY, {S40b}) |
| A | A | A | A | 80MHz (existing 80MHz operation) | PHY-CCA.indication(IDLE) |

| S40 b | S40 a | P | S | Channel (MHZ) | B0 B1 B2 B3 B4 |
|---|---|---|---|---|---|
| B | B | A | B | 20 | 00010 |
| A | B | A | B | 20+20 | 01010 |
| B | A | A | B | 40 | 00110 |
| A | A | A | B | 60 | 01110 |
| B | B | A | A | 40 | 00011 |
| A | B | A | A | 20+40 | 01011 |
| B | A | A | A | 60 | 00111 |
| A | A | A | A | 80 | 01111 |

Fig. 9B (951)

| S40 | P | S | S80 ab | S80 cd | Channel (MHZ) | B0 B1 B2 B3 B4 |
|---|---|---|---|---|---|---|
| B | A | B | B | B | 20 | 10000 |
| B | A | B | B | A | 20+40 | 10001 |
| B | A | B | A | B | 20+40 | 10010 |
| B | A | A | A | A | 20+80 | 10011 |
| B | A | A | B | B | 40 | 10100 |
| B | A | A | B | A | 40+40 | 10101 |
| B | A | A | A | B | 80 | 10110 |
| A | A | B | B | A | 120 | 10111 |
| A | A | B | B | B | 60 | 11000 |
| A | A | B | A | A | 60+40 | 11001 |
| A | A | A | B | A | 60+40 | 11010 |
| A | A | A | A | B | 80 | 11011 |
| A | A | A | A | A | 80+40 | 11100 |
| A | A | A | A | B | 120 | 11101 |
| A | A | A | A | A | — | 11110 |
| A | A | A | A | A | 160 | 11111 |

| S40 a | S40 b | P | S | S80 ab | S80 cd | Channel (MHZ) | B0 B1 B2 B3 | Notes |
|---|---|---|---|---|---|---|---|---|
| B | B | A | B | | | 20 | 0000 | 20MHz |
| B | B | A | A | | | 40 | 0001 | 40MHz |
| B | A | A | B | | | 40 | 0010 | |
| B | A | A | A | | | 60 | 0011 | 80MHz OFDMA with Channel Bonding |
| A | B | A | B | | | 20+20 | 0100 | |
| A | B | A | A | | | 20+40 | 0101 | |
| A | A | A | B | | | 60 | 0110 | |
| A | A | A | A | | | 80 | 0111 | 80MHz |
| A | A | A | A | A | A | 80+80 | 1000 | 80+80 MHz (discontinuous S80) |
| B | B | A | A | A | A | 120 | 1001 | |
| A | A | A | B | B | A | 60+40 | 1010 | 160MHz OFDMA with channel bonding |
| A | A | A | B | A | B | 60+40 | 1011 | |
| A | A | A | B | B | A | 60+80 | 1100 | |
| A | A | A | A | A | B | 80+40 | 1101 | |
| A | A | A | A | A | A | 120 | 1110 | |
| A | A | A | A | A | A | 160 | 1111 | 160MHz |

| S40a | S40b | P | S | S80ab | S80cd | Channel (MHZ) | B0 B1 B2 | Notes |
|---|---|---|---|---|---|---|---|---|
| B | B | A | B | B | B | 20 | 000 | 20MHz |
| B | B | A | A | B | B | 40 | 001 | 40MHz |
| A | A | A | B | B | B | 60 | 010 | 80MHz OFDMA with Channel Bonding |
| A | A | A | A | B | B | 80 | 011 | 80MHz |
| A | A | A | B | A | A | 60+80 | 100 | 160MHz OFDMA with channel bonding |
| A | B | A | B | A | A | 20+20+80 | 101 | |
| B | A | A | B | A | A | 40+80 | 110 | |
| A | A | A | A | A | A | 160 | 111 | 160MHz |

CHANNEL BONDING OPERATIONS IN WIRELESS COMMUNICATIONS

CROSS REFERENCE TO RELATED APPLICATIONS

This present disclosure claims the benefit of the priority of U.S. Provisional Application Ser. No. 62/151,938, filed Apr. 23, 2015, and entitled "Channel Bonding Operations in WirelessLAN" and claims benefit of the priority of U.S. Provisional Application Ser. No. 62/297,242, filed Feb. 19, 2016, and entitled "Channel Bonding Operations in WirelessLAN." All of the applications identified above are incorporated herein by reference in their entirety.

BACKGROUND

This disclosure relates to wireless communication systems, including Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices which can be referred to as client stations (STAs), client devices, clients, access terminals (ATs). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as Orthogonal Frequency Division Multiplexing (OFDM) for the physical (PHY) layer. In an OFDM based wireless communication system, a data stream is split into multiple data substreams. Such data substreams are sent over different OFDM subcarriers, which are commonly also referred to as tones or frequency tones. WLANs such as those defined in the Institute of Electrical and Electronics Engineers (IEEE) wireless communications standards, (e.g., IEEE 802.11a, IEEE 802.11n, IEEE 802.11ac, and IEEE 802.11ax, or any other standard by any other organization) can use OFDM to transmit and receive signals. Some wireless communication systems can use Orthogonal Frequency-Division Multiple Access (OFDMA) to enable different devices to communicate on different subsets of subcarriers at the same time.

Wireless communication devices in a WLAN can use one or more protocols for a medium access control (MAC) layer and a physical (PHY) layer. For example, a wireless communication device can use a Carrier Sense Multiple Access (CSMA) with Collision Avoidance (CA) based protocol for a MAC layer and OFDM for the PHY layer. The MAC layer can communicate with a Physical Layer Convergence Protocol (PLCP) sublayer. After receiving a MAC protocol data unit (MPDU) from the MAC layer, the PLCP sublayer can include PHY specific preamble fields to form a PLCP protocol data unit (PPDU) for transmission. A MPDU can also be called a PLCP service data unit (PSDU).

SUMMARY

The present disclosure includes systems and techniques for wireless communications. According to an aspect of the present disclosure, a technique for wireless communications includes sensing a group of channels for a channel contention operation that acquires two or more channels of the group of channels and detects a busy channel of the group of channels; determining a channel bonding indicator based on the channel contention operation; generating a preamble portion of a frame that includes the channel bonding indicator; generating a data portion of the frame, and transmitting the frame to one or more devices. Generating the preamble portion can include duplicating a legacy preamble on each of the acquired channels within the preamble portion. Generating the data portion can include setting first subcarriers that correspond to the acquired channels to data values, and setting second subcarriers that correspond to the busy channel to null values for at least a portion of the data portion of the frame.

This and other implementations can include one or more of the following features. Generating the preamble portion can include setting the second subcarriers that correspond to the busy channel to null values for at least a portion of the preamble portion. Generating the preamble portion can include duplicating the legacy preamble on the busy channel within the preamble portion, and wherein the channel bonding indicator is signaled via a resource allocation. Implementations can include selecting one of the acquired channels as a primary channel. Sensing the group of channels can include monitoring for traffic on each channel of the group of channels. Implementations can include causing to be unused one or more third subcarriers that correspond to an edge region of the acquired channels to minimize interference to the busy channel. The edge region can be adjacent to the busy channel in a frequency domain. Implementations can include generating a clear channel assessment indication that indicates whether each channel of the group of channels is busy or idle. In some implementations, the busy channel is in between the acquired channels such that the acquired channels form a non-continuous channel grouping.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Particular configurations of the technology described in this disclosure can be implemented so as to realize one or more of the following potential advantages. A described channel bonding mechanism can allow for more usable channel bandwidth without introducing additional new PHY modes for new channel sizes. A described channel bonding mechanism can allow for more flexible and more adaptive channel size selections in a dynamic and high density environment.

Details of one or more implementations are set forth in the accompanying drawings and the description below. Other features and advantages may be apparent from the description and drawings, and from the claims.

DRAWING DESCRIPTIONS

FIGS. 3A and 3B show a layout of different examples of a frame for downlink OFDMA based channel bonding on a 80 MHz operational channel.

FIGS. 6A, 6B, and 6C show different examples of channel bonding configurations of component channels in 80 MHz and 160 MHz OFDMA operational channels.

FIG. 7 shows a table of various channel combinations and respective PHY CCA indications to support OFDMA based channel bonding.

Figure 8:
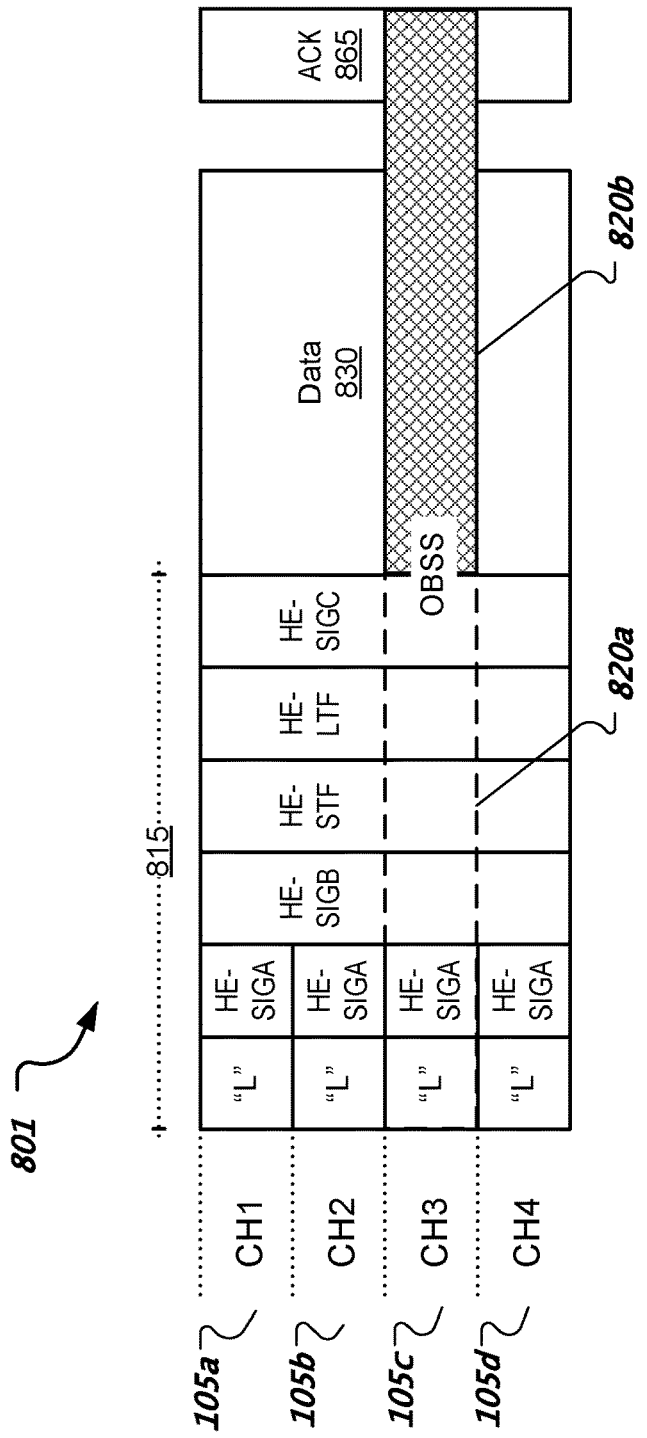

FIG. 8 shows a layout of an example of a frame for bifurcated downlink OFDMA based channel bonding.

FIGS. 9A and 9B show an example of bit value assignments for respective channel bonding and bandwidth indicators using a 5-bit field.

FIG. 10 shows an example of bit value assignments for respective channel bonding and bandwidth indicators using a 4-bit field.

FIG. 11 shows an example of bit value assignments for respective channel bonding and bandwidth indicators using a 3-bit field.

Figure 12:
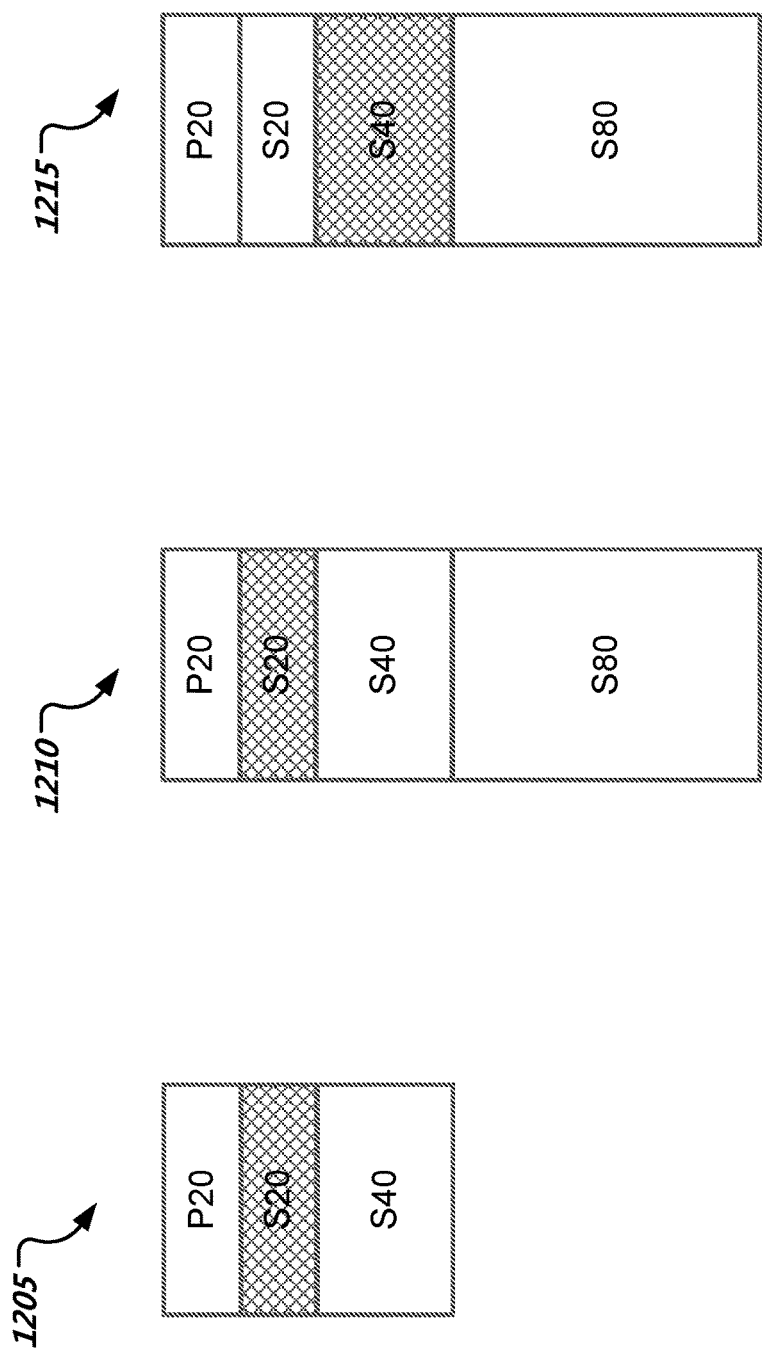

FIGS. 12A, 12B, and 12C show different examples of selected non-continuous channel bonding modes.

Figure 13:
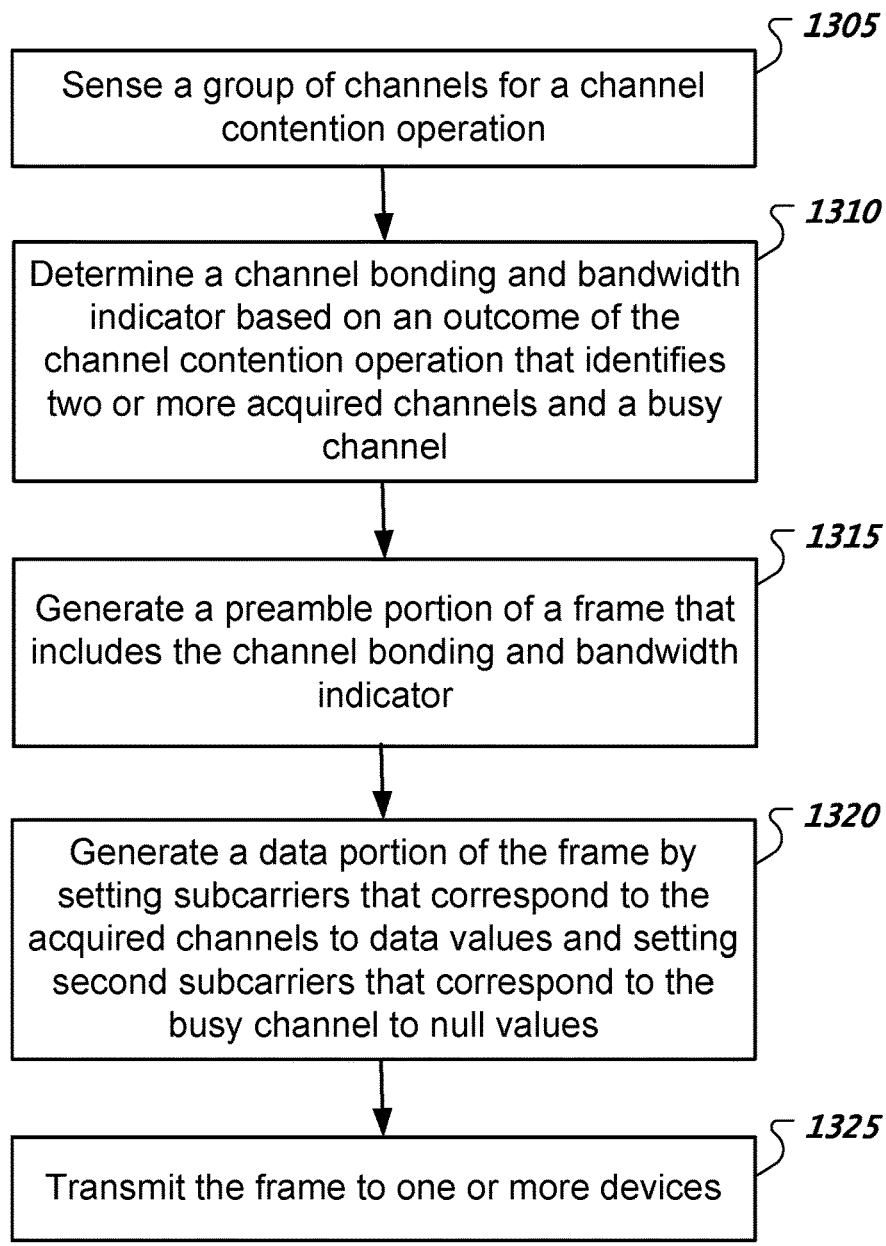

FIG. 13 shows a flowchart of an example of a channel bonding process.

Figure 14:
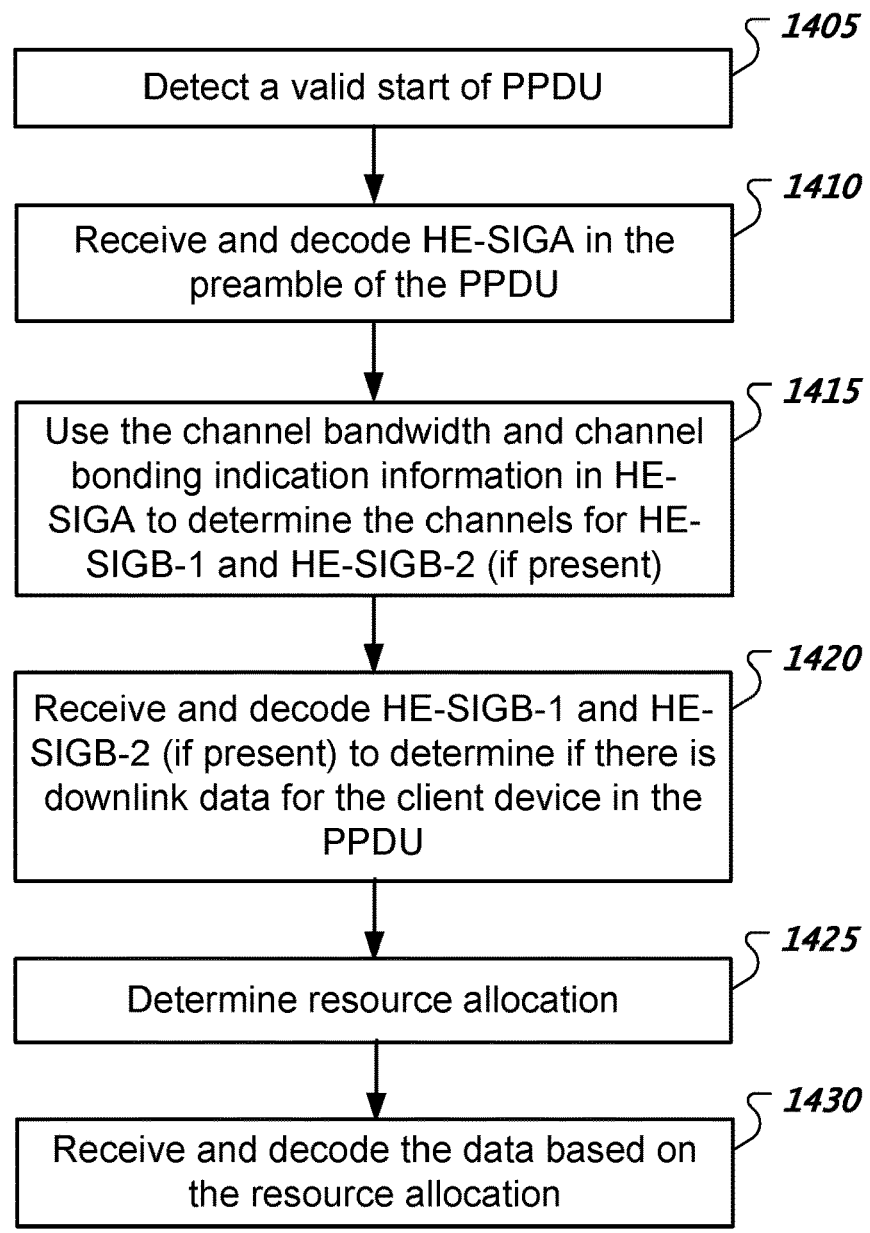

FIG. 14 shows a flowchart of an example of a receiver process.

Like reference symbols in the various drawings indicate like elements.

DETAILED DESCRIPTION

Channel bonding, also called channel aggregation, allows a device to operate on a wider operational channel containing multiple basic channel units in a frequency band. The device may not gain access to the full channel bandwidth of the wider operational channel, because one or more unit channels are busy and thus currently unavailable, e.g., in use by another device and hence there is an Overlapping Basic Service Set (OBSS). The device can use a channel bonding mechanism to aggregate channels that are available.

In some channel bonding mechanisms such as those in IEEE 802.11 based WLAN systems for 2.4 GHz and 5 GHz frequency bands, the 20 MHz channel is commonly used as the basic channel unit. IEEE 802.11n and 802.11ac have defined additional wider operational channels, e.g., 40 MHz, 80 MHz, 160 MHz, or 80+80 MHz channel. Such a wider operational channel can include multiple 20 MHz channels and can have its own set of PHY characteristics such as fast Fourier transform (FFT) size, number of data tones, number of edge tones, number of pilot tones, basic service set (BSS).

Operational channel size can refer to the channel bandwidth on which a radio interface is operating given a set of PHY characteristics, e.g., a 80 MHz BSS with a 1024-point FFT. Available channels, also called used channels or bonded channels, associated with a channel bonding operation can refer to the channels that a device contended for and gained access. OBSS channels, also called busy channels, can refer to the channels that a device contented for but did not gain access. A component channel associated with a channel bonding operation can refer to an available channel that a device selects and signals for use within the wider operational channel.

When contending for a full operational channel, the AP may sometimes acquire less than the full operational channel, e.g., may acquire three out of four 20 MHz channels, for downlink and uplink communications. To address this scenario, the AP can use an OFDMA-based channel bonding mechanism which can cause a device, such as an AP, client device or both, to generate an OFDM waveform based on a channel bandwidth that corresponds to the full operational channel bandwidth, e.g., 80 MHz, using PHY parameters of the full operational channel, e.g., FFT size, tone plan, OFDMA sub-channelization, and allocation mechanisms. The OFDMA-based channel bonding mechanism can further cause the device, such as an AP, client device or both, to introduce null subcarriers within the OFDM waveform that correspond to a busy channel, which provides for OFDMA and minimizes interference to the busy channel. For example, the AP can use the available 20 MHz channels to carry information and to not use any busy 20 MHz channels to carry information. Further, through one or more uplink allocations, the AP can cause the client devices to use the available 20 MHz channels to carry information and to not use any busy 20 MHz channels to carry information. Not using a busy channel can include setting tones corresponding to the busy channel to null. The available channels within an allocation can be continuous or non-continuous within a frequency band.

Figure 1:
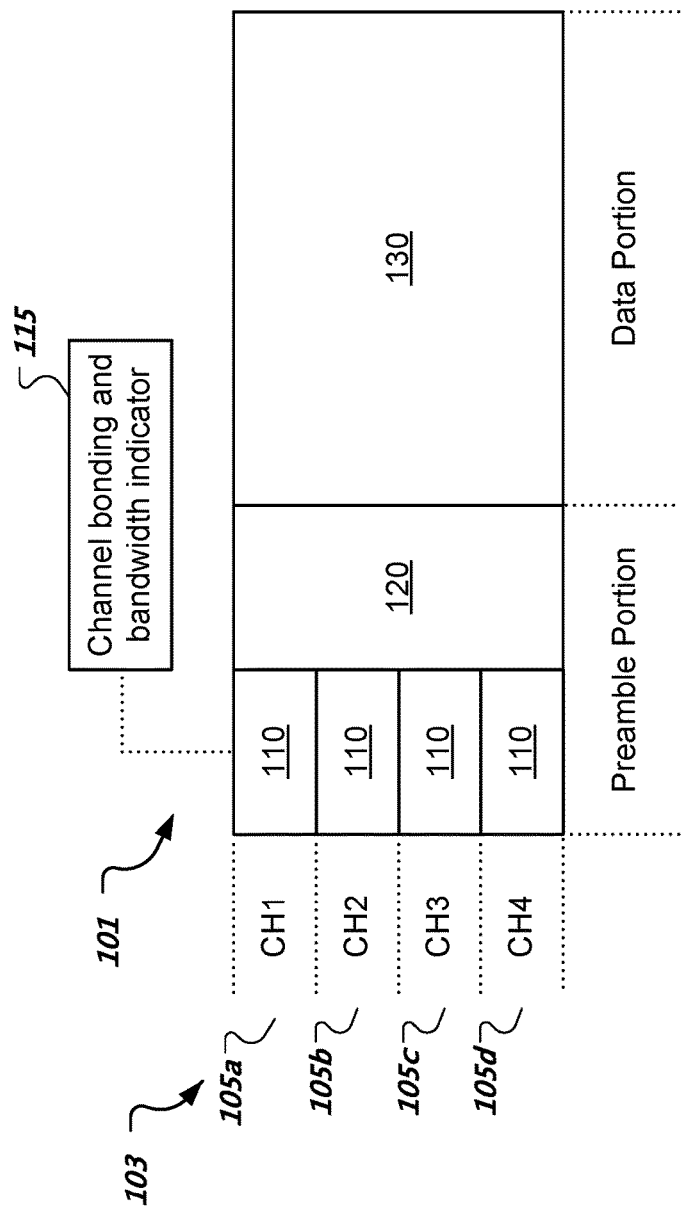
FIG. 1 shows a layout of an example of a frame that includes a channel bonding and bandwidth indicator.

FIG. 1 shows a layout of an example of a frame 101 that includes a channel bonding and bandwidth indicator 115. An AP can contend for multiple channels 105a, 105b, 105c, and 105d (labelled CH1, CH2, CH3, and CH4) that are parts of a wider operational channel 103. After gaining access, the AP can transmit a frame 101 that uses the channels 105a-d. The frame 101 can include a duplicated preamble portion 110, a non-duplicated preamble portion 120, and a data portion 130. The duplicated preamble portion 110 can enable backwards compatibility with devices that only support the channel size of an individual channel 105a-d rather than the channel size of the wider operational channel 103. As shown, the duplicated preamble portion 110 is duplicated on each of the channels 105a-d. The duplicated preamble portion 110 can include a channel bonding and bandwidth indicator 115. The channel bonding and bandwidth indicator 115 can signal which ones of the channels 105a-d are component channels. These component channels are used to carry the non-duplicated preamble portion 120 and the data portion 130 of the frame 101. Note that if channel contention is unsuccessful for one or more channels 105a-d, each deemed to be a busy channel, the AP can set subcarriers that correspond to each busy channel to null.

Figure 2:
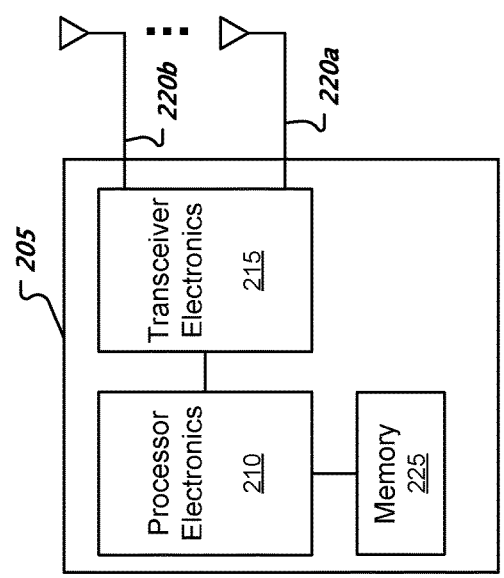
FIG. 2 shows a block diagram of a wireless communication device.

FIG. 2 shows a block diagram of a wireless communication device 205. The device 205 can include processor electronics 210 such as one or more processors that implement methods effecting the techniques presented in this disclosure. Various examples of device 205 include an AP or a client device. An AP can also be referred to as a base station (BS). A client device can also be referred to as a STA or mobile station (MS). In some implementations, the device 205 can be operated as an AP or as a client depending on a configuration parameter. The device 205 can include transceiver electronics 215 to send and receive wireless signals over one or more antennas 220a-b. In some implementations, transceiver electronics 215 can include multiple radio units. In some implementations, a radio unit includes a baseband unit (BBU) and a radio frequency unit (RFU) to transmit and receive signals. In some implementations, the device 205 includes dedicated circuitry for transmitting and dedicated circuitry for receiving. The device 205 can include one or more memories 225 configured to store information such as data and/or instructions. For example, a memory 225 can include instructions to perform a channel bonding operation. In some implementations, the device 205 can include an interface, such as a bus, a serial communication link, pins, electrical contacts points, or a combination thereof, coupled between the processor electronics 210 and the transceiver electronics 215.

FIG. 3A shows a layout of an example of a frame 301 for downlink OFDMA based continuous channel bonding on an 80 MHz operational channel. In this example, the AP contends for the entire 80 MHz operational channel, which includes channels CH1, CH2, CH3, and CH4, but only gains channels CH1, CH2, and CH3. These three channels form a continuous available channel grouping. In more detail, the AP conducts carrier sensing on each 20 MHz channel of the entire 80 MHz operational channel, and identifies the available channels (e.g., CH1, CH2, and C3), which in this case, provide 60 MHz of available bandwidth. The AP detected traffic on channel CH4 and has deemed it to be a busy channel 304, e.g., there is an OBSS caused by another device. The AP can generate and transmit a frame 301 that spans all of the channels including the busy channel 304. For example, the frame 301 can be transmitted via an OFDMA signal using the entire 80 MHz operational channel. The frame 301 includes null subcarriers corresponding to the busy channel 304, e.g., CH4, to minimize interference to the busy channel 304. In some implementations, the AP can signal null subcarrier allocations in a downlink resource allocation.

The frame 301 can include a preamble portion 305 and a data portion 310. After the frame 301, there can be a period for acknowledgements 315. The preamble portion 305 can include a legacy preamble 307 that includes a legacy short training field (L-STF), a legacy long training field (L-LTF), and a legacy signal field (L-SIG). The preamble portion 305 can include a high efficiency (HE) signal "A" field (HE-SIG-A), a HE signal "B" field (HE-SIG-B), a HE short training field (HE-STF), and one or more HE long training fields (HE-LTFs). In some implementations, the preamble portion 305 can include a HE signal "C" field (HE-SIG-C).

The legacy preamble 307, including L-STF, L-LTF, and L-SIG, can be duplicated on each of the available 20 MHz channels. Further, an HE-SIG-A preamble can be duplicated on each of the available 20 MHz channels. The duplication allows legacy devices, which are expecting a 20 MHz bandwidth signal, to receive and decode one or more of the duplicated preambles. This example can be applied to other cases such as where CH2, CH3, and CH4 are available, but CH1 is not available. This example can be applied to different layouts of primary, secondary, and secondary 40 channels.

FIG. 3B shows a layout of an example of a frame 351 for downlink OFDMA based non-continuous channel bonding on an 80 MHz operational channel. In this example, the AP contends for the entire 80 MHz operational channel, which includes channels CH1, CH2, CH3, and CH4, but only gains channels CH1, CH2, and CH4. These three channels form a non-continuous available channel grouping, since CH3, the busy channel 354, causes a split among the available channels. In more detail, the AP conducts carrier sensing on each 20 MHz channel of the entire 80 MHZ operational channel, and identifies the available channels (e.g., CH1, CH2, and C4). The AP detected traffic on channel CH3 and has deemed it to be a busy channel 354, e.g., there is an OBSS. The AP can generate and transmit a frame 351 that spans all of the channels including the busy channel 354. To minimize interference to the busy channel 354, the AP can include null subcarriers corresponding to the busy channel 354. Thus, while the frame 351 occupies an 80 MHz bandwidth signal, there is only 60 MHz of bandwidth available for data since 20 MHz is unavailable due to the included null subcarriers. The frame 351 can include a preamble portion 355 and a data portion 360. The preamble portion 355 can include a legacy preamble 357 that is duplicated on each of the available channels (e.g., CH1, CH2, and C4), but not duplicated on the busy channel 354. After an end of the frame 351, there can be a period for acknowledgements 365.

Wireless communication systems can use channel bonding together with OFDMA for the downlink (from AP to client), the uplink (from client to AP), or both. With an OFDMA based system, each client device can be allocated with a portion of the overall operational channel via a resource allocation. In some implementations, a resource allocation can specify a number of OFDM tone blocks. In some implementations, the allocation can specify a number of subchannels. The allocation can also identify which of the tone blocks are assigned to a STA. In some implementations, OFDM tones can be partitioned into multiple resource units (RUs). The AP can allocate each of the multiple RUs to one or more client devices for transmission of data to, or by, the one or more of the client devices.

To schedule one or more uplink OFDMA transmissions, an AP can use a downlink trigger frame to signal uplink resource allocations to the client devices. In OFDMA-based channel bonding, the downlink trigger frame can be required to be correctly received and decoded by the client devices, even when one or more OBSS channels are part of the full OFDMA operational channel. If a downlink trigger frame is in a Null Data Packet (NDP) frame, e.g., uplink resource allocation signals are encoded in HE-SIGB, then the HE-SIGB can be required to be received and decoded by the client devices in the available channels for channel bonding. In some implementations, a downlink trigger frame can be included in a MAC frame, e.g., uplink resource allocation signals are encoded in a MAC frame. The MAC frame with the allocation can be transmitted as a legacy PPDU, can be transmitted in the primary 20 MHz channel, and can be duplicated on each available 20 MHz channel used in the channel bonding. In some implementations, the MAC frame with the resource allocation can be transmitted as a HE-PPDU. The HE-PPDU can be transmitted in a downlink broadcast resource allocation. In some implementations, the uplink resource allocations can be transmitted in the 20 MHz primary channel, and can be duplicated on each remaining 20 MHz channel used in the channel bonding.

Figure 4A:
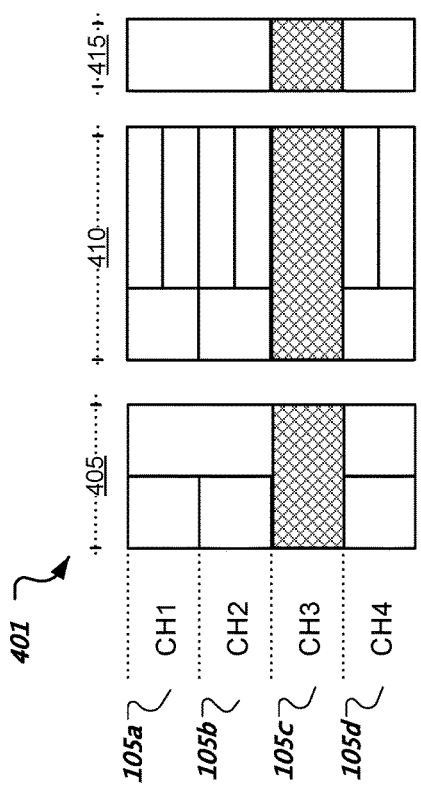
FIGS. 4A and 4B show an example of a sequence of frame exchanges among an access point and client devices that include an uplink OFDMA based channel bonded frame.

FIG. 4A shows an example of a sequence 401 of frame exchanges among an AP and client devices that include an uplink OFDMA based channel bonded frame. The sequence 401 shows a downlink (DL) trigger frame 405, uplink (UL) multi-user (MU) PPDU 410, and downlink acknowledgement 415. The AP can contend and gain the entire 80 MHz operational channel or a portion thereof. In this example, while contending for the 80 MHz operational channel, the AP only gains access for CH1, CH2, and CH4 to form a non-continuous available channel grouping. This grouping is used for both downlink and uplink exchanges within the sequence 401. Despite being transmitted on the full 80 MHz operational channel, the non-continuous available channel grouping provides 60 MHz of usable bandwidth, and less if there are guard tones. Note that if CH4 was busy and CH3 was available, it would form a continuous available channel grouping. The downlink trigger frame 405 can include information about the available channels for channel bonding. The downlink trigger frame 405 can include an uplink resource allocation for the uplink multi-user PPDU 410. In some implementations, the uplink resource allocation signals the available channels for channel bonding. In some implementations, the downlink acknowledgement 415 can be a block acknowledgement.

Figure 4B:
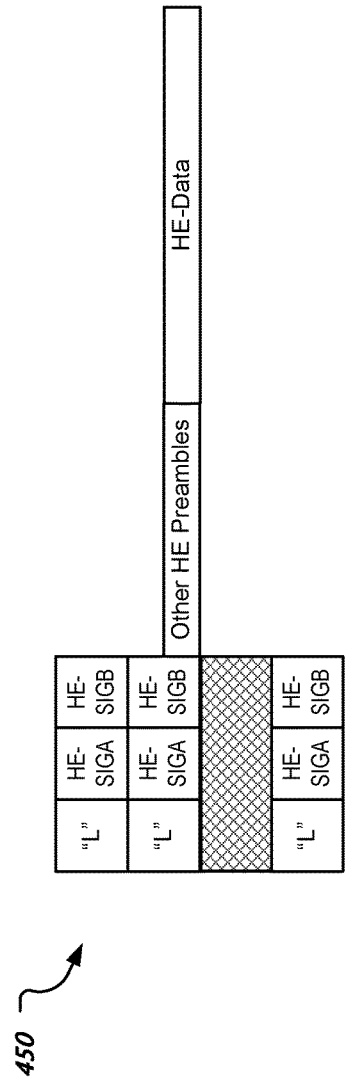

FIG. 4B shows an example of the uplink PPDU 450 from one client device. The PPDU 450 can include duplicated legacy ("L") preambles and duplicated HE preambles. The PPDU 450 can include a non-duplicated portion that includes one or more other HE preambles and HE data. Subcarriers for the non-duplicated portion of the uplink PPDU 450 transmission can be selected based on a multi-user uplink resource allocation included in the downlink trigger frame 405. The unallocated subcarriers for the non-duplicated portion of the uplink PPDU 450 transmission can be set to null.

Figure 5:
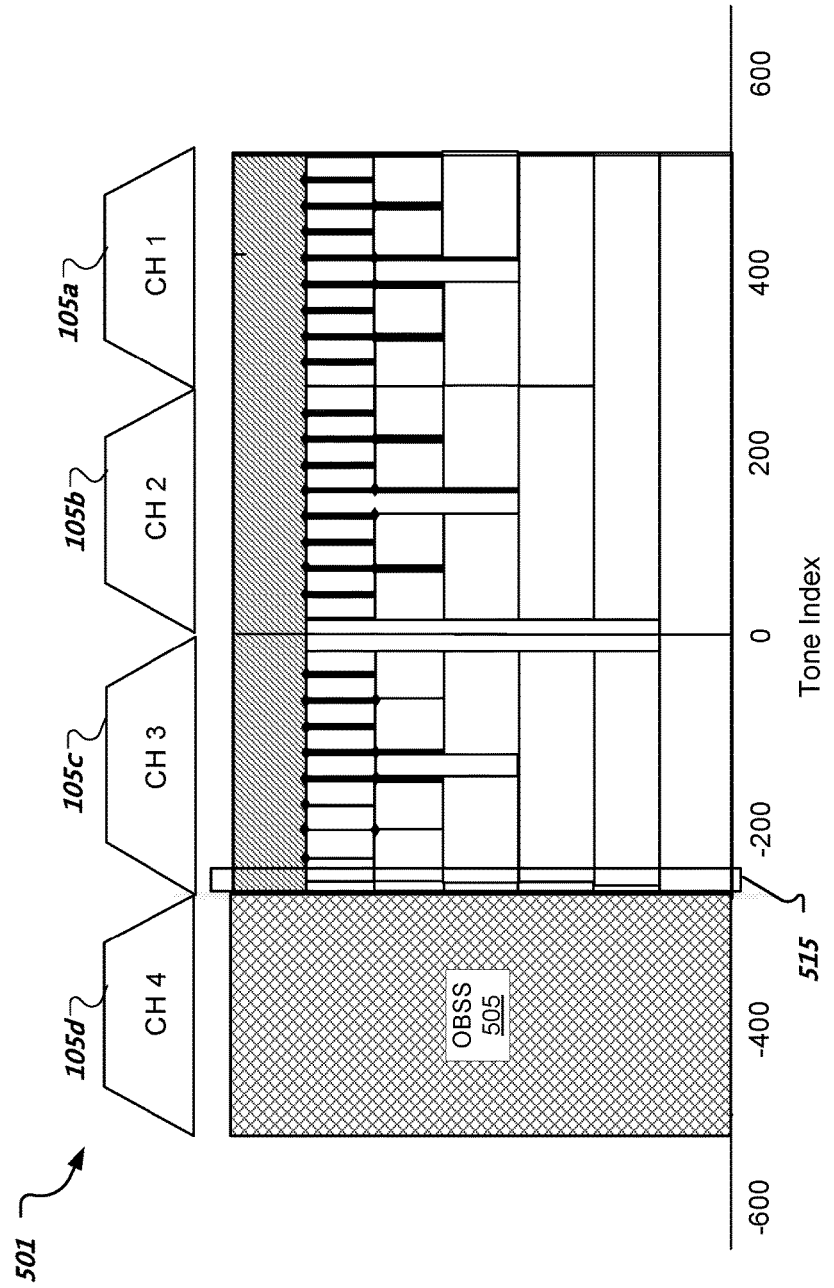
FIG. 5 shows a layout of an example of an 80 MHz OFDMA tone plan and tone block to mitigate interference.

FIG. 5 shows an example of a layout 501 of an 80 MHz OFDMA tone plan and tone block, e.g., sub-channelization, design to mitigate interference from a busy, OBSS channel 505. The layout 501 covers a group of channels 105a-d and different tone plans and their resource unit configurations, e.g., 26-tone resource units, 52-tone resource units, 108-tone resource units, 242-tone resource units, or a combination thereof. Edge tones of an available channel (e.g., CH3) that are next to the OBSS channel 505 (e.g., CH 4 in this example) may experience high interference from traffic on the OBSS channel 505. In some implementations, the AP can create a small tone block allocation, e.g., 26-tone block 515, at the edge next to the OBSS channel 505, and leave it unused, e.g., not allocated to any real client devices. In some implementations, the AP can allocate the leftover tones at the edges of each 20 MHz channel, in the OFDMA tone block design.

To detect available and busy channels, the AP can perform a Clear Channel Assessment (CCA). The CCA is a logical function in the PHY layer that determines the current use state of a wireless medium. The PHY layer can report CCA indications to a higher layer. In legacy WLAN systems, the PHY layer can issue a PHY-CCA.indication(IDLE) primitive to indicate the current operating channel is available to access, e.g., the entire 80 MHz channel is available for a BSS operating at 80 MHz. Further, the PHY layer can issue a PHY-CCA.indication(BUSY, {channel_list}) primitive to indicate one of the following: if channel_list=primary, the primary channel is busy; if channel_list=secondary, the secondary channel is busy, while the primary channel is available; if channel_list=secondary40, the secondary40 is busy, while the primary and secondary channels are available; if channel_list=secondary80, the secondary80 is busy, while the primary, secondary, and secondary40 channels are available.

PHY layer CCA indications can be modified to support OFDMA based channel bonding. For OFDMA based channel bonding, CCA indications issued by the PHY layer can include the state of each component channel in the channel bonding. The component channels can be defined as channel units in channel bonding. As described below, FIGS. 6A, 6B, and 6C show different examples of channel bonding configurations of component channels in 80 MHz and 160 MHz OFDMA operational channels. The CCA indications can be designed based on one or more channel bonding configurations.

FIG. 6A shows an example of a configuration 601 of channel bonding component channels in 80 MHz OFDMA. For a BSS operating at 80 MHz OFDMA, the component channels for channel bonding can include four 20 MHz channels: primary (P), secondary (S), secondary 40a (S40a), and secondary 40b (S40b).

FIG. 6B shows an example of a configuration 621 of channel bonding component channels in 160 MHz OFDMA. For a BSS operating in 160 MHz OFDMA, the component channels for channel bonding can include eight 20 MHz component channels: primary (P), secondary (S), secondary 40a (S40a), secondary 40b (S40b), and secondary 80a to d (S80a, S80b, S80c, and S80d).

FIG. 6C shows another example of a configuration 641 of channel bonding component channels in 160 MHz OFDMA. For a BSS operating in 160 MHz OFDMA, the component channels for channel bonding can include two 20 MHz component channels, e.g., primary (P), secondary (S); and three 40 MHz component channels, e.g., secondary 40 (S40), secondary 80ab (S80ab), and secondary 80cd (S80cd).

FIG. 7 shows a table 701 of various channel combinations and respective PHY CCA indications to support OFDMA-based channel bonding. As shown in FIG. 7, "A" indicates an available channel; "B" indicates a busy channel; and "X" indicates not applicable. In this example, there is an 80 MHz OFDMA based channel bonding with four 20 MHz component channels (e.g., P, S, S40a, and S40b) for channel bonding, and channel access occurs when the primary channel is available. When reporting a BUSY indication, the PHY can list each individual channel that is busy. In one example, the 80 MHz OFDMA configuration of FIG. 7 can correspond with one or more configurations illustrated in FIG. 6A, 6B, or 6C.

PHY CCA indication primitive definitions and operational channels can be defined for other cases such as 160 MHz OFDMA operation, with eight 20 MHz component channels; and 160 MHz OFDMA operation, with two 20 MHz and three 40 MHz component channels. Further, OFDMA-based channel bonding can be applied to the cases where the primary channel is not fixed, so as to allow further improvement of the channel usage. In some implementations, the AP starts a BSS operation with 80 MHz OFDMA with four 20 MHz component channels, e.g., CH1, CH2, CH3, and CH4; the AP chooses CH1 as its primary channel. In some implementations, the AP can decide and communicate an ordered list for selecting a primary channel to the client devices, e.g., <CH1, CH2, CH3, and CH4>, which means: CH1 is the default primary channel; only when CH1 is not available, then CH2 is selected as the primary channel; only when both CH1 and CH2 are not available, then CH3 is selected as the primary channel; only when CH1, CH2, and CH3 are not available, then CH4 is selected as the primary channel.

FIG. 8 shows a layout of an example of a frame 801 for bifurcated downlink OFDMA based channel bonding. In bifurcated OFDMA based channel bonding, the OFDMA PPDU preamble portion 815 of the frame 801 is transmitted in the full operational channel including the busy OBSS channel (see the dashed portion 820a of the OBSS channel), while the remaining data portion 830 of the OFDMA PPDU part of the frame 801 is transmitted on the available component channels. Unlike the preamble portion 815, null subcarriers are used for OBSS channel within the data portion 830 of the frame 801 (see the patterned portion 820b of the OBSS channel). Bifurcated downlink OFDMA based channel bonding can be applied to other cases, including downlink or uplink directions, continuous or non-continuous channel bonding, or different layouts of primary, secondary, secondary 40, or secondary 80 channels. Acknowledgements 865 can be transmitted in the uplink direction. With bifurcated OFDMA based channel bonding, the interference caused by the preamble transmission on the unavailable component channel is considered to be tolerable, because it can be a very short duration in the time domain relative to the entire PPDU length. A similar consideration can be used in the acknowledgement transmissions, where a station transmits the ACK without requiring sensing the wireless medium, as the ACK transmission is relatively very short.

Based on the bifurcated OFDMA based channel bonding technique shown in FIG. 8, where the preamble portion is transmitted on full operational channel inclusive of the busy channel, and the data portion transmitted on one or more available component channels, the available component channel information is not required to be explicitly signaled. The available component channel information can be implied in a resource allocation. For example, in HE-Data, the AP can allocate available channels to clients and not allocate any of the busy, OBSS channels. The AP can set or cause the unallocated channels, or portions thereof, to null. In some implementations, a HE preamble may require additional robustness to compensate for potential high interference due to potential overlapping transmissions on the OBSS channels.

In an OFDMA based channel bonding technique that is not bifurcated, the entire OFDMA PPDU is transmitted on the available component channels, including both the preamble portion and data portion; see, for example, FIGS. 3A and 3B. This technique can be applied to other cases, including downlink or uplink directions, continuous or non-continuous channel bonding, or different layouts of primary, secondary, secondary 40, or secondary 80 channels.

When the OFDMA channel bonding PPDU format is of the type shown in FIG. 3A or 3B, additional signaling for channel bonding can be required. A header can include channel bonding signaling, such as a channel bonding indicator, or a channel bonding and bandwidth indicator, to indicate the available component channel information. In some implementations, the channel bonding signaling can be included in a PPDU header as early as possible, e.g., at the same time as or a similar time to the channel bandwidth signaling. Assuming the legacy preamble and HE-SIGA are duplicated on each 20 MHz channel, the receiver will initially depend on the primary channel to receive and decode the legacy preamble and HE-SIGA. Based on the channel bonding and bandwidth information decoded from HE-SIGA on the primary channel, then a combining gain from the duplication in frequency domain can be achieved. For the remaining PPDU portions: the HE-SIGB can be encoded and decoded based on the available channels; HE-STF and HE-LTF can be transmitted and received in the available channels; the HE-SIGC, if used, can be transmitted and received in the available channels; and for HE-Data, the available channels can be allocated to the client devices where one or more channels corresponding to one of more busy channels, if exists, are set to NULL.

In some implementations, a signaling field such as HE-SIGA can include channel bonding signaling. In such implementations, the HE-SIGA is required to be on a primary channel. If HE-SIGA is duplicated on each 20 MHz channel, a device can combine the HE-SIGAs received in different 20 MHz channels to improve the gain of HE-SIGA decoding. In some implementations, channel bonding information for transmitting and receiving HE-SIGB and other following PHY header fields can be provided. In some implementations, a signaling field such as HE-SIGB can include channel bonding signaling. In such implementations, the HE-SIGB is required to be on the primary channel.

In some implementations, if channel bonding PPDUs are included in transmission opportunity (TXOP) protected frames, then channel bonding and bandwidth information can be carried in a frame such as a Request to Send (RTS) frame. In some implementations, a TXOP protect frame is used for a non-continuous channel bonding mode. In some implementations, for an uplink channel bonding PPDU, channel bonding and bandwidth information can be signaled in a downlink trigger frame.

Channel bonding signaling can be used to indicate which available channels are used for bonding. Channel bonding signaling can be encoded together with channel bandwidth, or encoded separately. This is a design trade-off between channel bonding flexibility and signal field size. For example, if limiting the signal field size, then it may be necessary to limit the number of allowed channel bonding cases, e.g., allowing 40 MHz as component channels in 160 MHz OFDM operation, instead of all 20 MHz component channels. If allowing more channel bonding cases, then a longer signal field may be required.

Based on the component channel layouts shown in FIGS. 6B and 6C, a header can include a N-bit field to signal both channel bonding and bandwidth, where N is in integer such as 4 or 5. The signaling field design ideas shown in the examples can be applied to other cases, e.g., with different operational channel sizes, with different component channel sets, or with different layouts of the component channels, etc.

FIGS. 9A and 9B show an example of bit value assignments for respective channel bonding and bandwidth indicators using a 5-bit field. The assignments allow for various channel bonding combinations for 80 MHz OFDMA based channel bonding and 160 MHz OFDMA based channel bonding. Bit B0 is the bandwidth indicator, whereas bits B1, B2, B3, and B4 are the channel bonding indicator that together signal available component channels.

FIG. 9A shows an assignment table 901 for an example of 5-bit encoding for an 80 MHz operational channel. In this example, bandwidth indicator bit B0 is set to zero to indicate an 80 MHz operational channel. FIG. 9B shows an assignment table 951 for an example of 5-bit encoding for a 160 MHz operational channel. In this example, bandwidth indicator bit B0 is set to one to indicate a 160 MHz operational channel. The remaining bits B1, B2, B3, and B4 signal available component channels. In some implementations, if an 80+80 mode is supported, then the code 10000 can be used to signal the 80+80 mode. In some implementations, a 20 MHz channel can be signaled by the code 00010.

FIG. 10 shows an example of a table 1001 including bit value assignments for respective channel bonding and bandwidth indicators using a 4-bit field. The assignments allow for various channel bonding combinations for 160 MHz OFDMA. In this example, a packet header includes a 4-bit field to signal channel bonding and bandwidth. To decrease the size of the signaling, the channel size and channel bonding combinations can be selectively chosen. The initial five codes for legacy channel sizes, e.g., 20, 40, 80, 160, and 80+80, can be fixed. The remaining eleven codes can be assigned to the selected combinations either in a static way or in a configurable way. If in a configurable way, the AP can transmit the current configuration to the client devices in a MAC management frame. For example, such a MAC management frame can include information that maps the codes, e.g., bit value assignments, to specific channel combinations. The selection of the channel size and channel bonding combinations can be based on expected usages, used channel sizes, implementation complexity, or a combination thereof.

FIG. 11 shows an example of a table 1101 including bit value assignments for respective channel bonding and bandwidth indicators using a 3-bit field. The assignments allow for various channel bonding combinations for 160 MHz OFDMA. In this example, a packet header includes a 3-bit field to signal channel bonding and bandwidth. The initial codes for legacy channel sizes, e.g., 20, 40, 80, 160, and 80+80, can be fixed. The remaining codes can be assigned to system selected channel combinations either in a static way or in a configurable way. If in a configurable way, the AP can transmit the current channel combinations configuration to the client devices in a MAC management frame.

FIGS. 12A, 12B, and 12C show different examples of selected non-continuous channel bonding modes. Non-continuous channel bonding can be limited to a few specific channel combinations to reduce the signaling and implementation complexity. A single bit can be used for channel bonding signaling. For example, the modes of FIG. 12A and FIG. 12B can be used together with 1-bit signaling in HE-SIGA. In another example, the modes of FIG. 12A and FIG. 12C can be used together with 1-bit signaling in HE-SIGA.

FIG. 12A shows an example of a non-continuous channel bonding mode for an 80 MHz operational channel 1205 with the S20 being busy and not bonded and the available channels P20 and S40 providing bandwidth of 60 MHz. In this example, limiting the 60 MHz bandwidth channel bonding mode to only occur for the shown available channels can reduce signaling overhead at the expense of excluding channel bonding options such as P20+S20+one 20 MHz in S40, and P20+one 20 MHz in S40 for 40 MHz; however P20+S20 is still allowed.

FIG. 12B shows an example of a non-continuous channel bonding mode for a 160 MHz operational channel 1210 with the S20 being busy and not bonded and the available channels P20, S40, and S80 providing bandwidth of 140 MHz. FIG. 12C shows an example of a non-continuous channel bonding mode for a 160 MHz operational channel 1215 with the S40 being busy and not bonded and the available channels P20, S20, and S80 providing bandwidth of 120 MHz.

FIG. 13 shows a flowchart of an example of a channel bonding process. FIG. 13 may utilize any of the concepts described in connection with FIGS. 1-12C. At 1305, the process includes sensing a group of channels for a channel contention operation. Sensing the group of channels can include monitoring for traffic on each channel of the group of channels. In some implementations, sensing the group of channels can include performing a CCA. In some implementations, a PHY layer can generate a CCA indication that indicates each channel of the group of channels that is busy. Based on the CCA indication, a higher layer such as a MAC layer can select channels for channel bonding.

At 1310, the process includes determining a channel bonding and bandwidth indicator based on an outcome of the channel contention operation. Based on a channel traffic detection, the channel contention operation can identify one or more busy channels out of the group of channels. Based on a lack of channel traffic detection or at least a lack of a signal exceeding a minimum threshold, the channel contention operation can identify one or more acquired channels out of the group of channels. The process can select one of the acquired channels as a primary channel. In some implementations, the channel bonding and bandwidth indicator can indicate a primary channel selection. The channel bonding and bandwidth indicator can be divided into a channel bonding indicator and a bandwidth indicator.

At 1315, the process includes generating a preamble portion of a frame that includes the channel bonding and bandwidth indicator. The channel bonding and bandwidth indicator can include a N-bit field, where N can be 1, 2, 3, 4, 5, or greater. Generating the preamble portion can include duplicating a legacy preamble on each of the acquired channels within the preamble portion. In some implementations, generating the preamble portion can include setting subcarriers that correspond to the busy channel to null values for at least a portion of the preamble portion. In some implementations, generating the preamble portion can include duplicating the legacy preamble on the busy channel within the preamble portion. Generating the preamble portion can include causing a PHY layer to create an OFDMA-based waveform.

At 1320, the process includes generating a data portion of the frame by setting subcarriers that correspond to the acquired channels to data values and setting second subcarriers that correspond to the busy channel to null values. The process can include causing to be unused one or more subcarriers that correspond to an edge region of the acquired channels to minimize interference to the busy channel. The edge region can be adjacent to the busy channel in a frequency domain. Generating the data portion can include causing a PHY layer to create an OFDMA-based waveform. At 1325, the process includes transmitting the frame to one or more devices.

In some implementations, the overall bandwidth (e.g., 80 MHz operational or 160 MHz operational) is fixed or determined beforehand. For example, an AP can determine a channel bonding indicator and include the channel bonding indicator in a frame's preamble portion. In some implementations, a bandwidth indicator is included in a frame that precedes a frame containing the channel bonding indicator.

In some implementations, an AP can select channel configurations for channel bonding. For example, out of all possible busy/available combinations of the group of channels, the AP can select a subset of these combinations and assign codes to them. The AP can map selected channel configurations, e.g., selected channel combinations, to specific codes, e.g., bit sequences. The AP can transmit the mappings to one or more devices to enable a device to properly interpret a received channel bonding and bandwidth indicator. In more detail, after the codes are assigned, the AP can select one of these codes to be a channel bonding and bandwidth indicator for a particular frame.

In some implementations, a channel bonding and bandwidth indicator can be determined by information from a channel contention operation and from a Station Management Entity (SME). When an AP creates a new BSS, the AP can select its operation channel bandwidth based on the parameters provided in a MLME-START.request primitive generated by the SME. The AP can keep operating at its selected channel bandwidth, and use the OFDMA-based channel bonding mechanism to maximize the utilization of the available channels. In some implementations, the OFDMA-based channel bonding mechanism can support all possible combinations of available channel groupings. In some implementations, the OFDMA-based channel bonding mechanism can support a selective subset of all the possible combinations of available channel groupings, for a trade-off among the signaling overhead, implementation complexity, and the channel utilization gain.

An AP device can include an interface to access a wireless medium and processor electronics coupled with the interface. The processor electronics can be configured to control sensing of a group of channels for a channel contention operation that acquires two or more channels of the group of channels and detects a busy channel of the group of channels. In some implementations, processor electronics can be configured to control sensing of a group of channels for a channel contention operation that acquires one or more channels of the group of channels. The processor electronics can be configured to determine a channel bonding indicator based on the channel contention operation, generate a preamble portion of a frame that includes the channel bonding indicator, generate a data portion of the frame, and control, via the interface, a transmission of the frame to one or more devices. The processor electronics can be configured to duplicate a legacy preamble on each of the acquired channels within the preamble portion. The processor electronics can be configured to set first subcarriers that correspond to the acquired channels to data values within the data portion. The processor electronics can be configured to set second subcarriers that correspond to the busy channel to null values for at least a portion of the data portion of the frame.

Processor electronics of the access point can be configured to set the second subcarriers that correspond to the busy channel to null values for at least a portion of the preamble portion. In some implementations, the processor electronics can be configured to duplicate the legacy preamble on the busy channel within the preamble portion. The channel bonding indicator can be signaled via a resource allocation. The processor electronics can be configured to select one of the acquired channels as a primary channel. The sensing can include monitoring for traffic on each channel of the group of channels. The processor electronics can be configured to cause to be unused one or more third subcarriers that correspond to an edge region of the acquired channels to minimize interference to the busy channel. The edge region can be adjacent to the busy channel in a frequency domain. The channel bonding indicator can be included in a channel bonding and bandwidth indicator of the preamble portion of the frame. The processor electronics can be configured to select channel configurations for channel bonding, and control a transmission of information about the selected channel configurations to enable a device to properly interpret the channel bonding and bandwidth indicator. The processor electronics can be configured to generate a clear channel assessment indication that indicates whether each channel of the group of channels is busy or idle. In some cases, the busy channel is in between the acquired channels such that the acquired channels form a non-continuous channel grouping. In some implementations, the processor electronics can be configured to control sensing of a group of channels for a channel contention operation that acquires one or more channels of the group of channels.

In some implementations, an access point device can perform operations including sensing a group of channels for a channel contention operation that acquires at least an available channel of the group of channels and detects a busy channel of the group of channels; determining a channel bonding indicator based on the channel contention operation; determining a preamble portion of a frame that includes the channel bonding indicator and determining a data portion of the frame; and transmitting the frame to one or more devices. Determining the preamble portion can include duplicating a legacy preamble on each of the acquired channels within the preamble portion. Determining the data portion can include setting at least a first subcarrier corresponding to the at least an acquired available channel to data values. Determining the data portion can include setting at least a subcarrier corresponding to the busy channel to null values for at least a portion of the data portion of the frame.

At the receiving side of a PPDU with OFDMA-based downlink channel bonding, in some implementations, a client device receives and decodes the HE-SIGA in the preamble of the PPDU, and then uses the information of channel bandwidth and channel bonding indication information in HE-SIGA to determine which component channel or channels to receive the resource allocation signals, e.g., HE-SIGB-1 and HE-SIGB-2. After receiving and decoding the resource allocation signals, if there is a downlink resource allocation to the client device, then the client device receives and decodes the data portion on the given downlink resource allocation.

FIG. 14 shows a flowchart of an example of a receiver process used by a wireless device, such as a client device, that receives a PPDU containing channel bandwidth and channel bonding indication information. FIG. 14 may utilize any of the concepts described in connection with FIGS. 1-13. At 1405, the process can detect a valid start of the PPDU. At 1410, the process can receive and decode HE-SIGA in the preamble of the PPDU. At 1415, the process can use the channel bandwidth and channel bonding indication information in the HE-SIGA of the preamble to determine the channels for HE-SIGB-1 and HE-SIGB-2 (if present). At 1420, the process can receive and decode HE-SIGB-1 and HE-SIGB-2 (if present) to determine if there is downlink data for the client device in the PPDU. At 1425, the process can determine a resource allocation. In some implementations, the preamble includes a resource allocation block. In some implementations, the resource allocation is signaled in a frame before the PPDU. At 1430, the process can receive and decode the data based on the resource allocation.

A client device can include an interface to access a wireless medium and processor electronics coupled with the interface. The processor electronics can be configured to receive a frame via a group of channels associated with the wireless medium, the group of channels including two or more used channels and a busy channel. The received frame can include a first preamble portion, a second preamble portion, and a data portion. The first preamble portion can include a channel bonding and bandwidth indicator. The first preamble portion can include a legacy preamble duplicated on each of the used channels. The processor electronics can be configured to use the channel bonding and bandwidth indicator to determine the used channels of the group of channels and to decode the second preamble portion via the used channels, the used channels being used within the frame to carry data and preamble information. The processor electronics can be configured to determine whether to decode at least a portion of the data portion based on the second preamble portion. The processor electronics can be configured to decode at least the portion of the data portion. The second preamble portion and the data portion can span the group of channels including the busy channel. The data portion can be generated by setting first subcarriers that correspond to the used channels to data values, and setting second subcarriers that correspond to the busy channel to null values for at least a portion of the data portion of the frame. In some implementations, the processor electronics are configured to receive information about a group of channel configurations, in a communication prior to the frame, to enable proper interpretation of the channel bonding and bandwidth indicator. In some cases, the busy channel can be in between the used channels such that the used channels form a non-continuous channel grouping. In some implementations, the processor electronics can be configured to receive a frame via a group of channels associated with the wireless medium, the group of channels including one or more used channels.

A technique implemented by a client device can include receiving a frame; determining a group of channels associated with the frame and a preamble portion of the frame that includes a channel bonding indicator; and determining at least an available channel of a group of channels based on the channel bonding indicator. The preamble portion can include a legacy preamble on one or more channels of the group of channels within the preamble portion. The group of channels can include a busy channel. One or more subcarriers corresponding to the busy channel includes null values for at least a portion of the data portion of the frame.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
    sensing a group of channels for a channel contention operation that acquires two or more channels of the group of channels and detects a busy channel of the group of channels;
    based on the channel contention operation, determining a channel bonding indicator that signals which ones of the group of channels are component channels;
    generating a preamble portion of a frame that includes the channel bonding indicator, wherein generating the preamble portion comprises duplicating a legacy preamble on each of the acquired channels within the preamble portion;
    generating a data portion of the frame, wherein generating the data portion comprises (i) setting first subcarriers that correspond to the acquired channels to data values, and (ii) setting second subcarriers that correspond to the busy channel to null values for at least a portion of the data portion of the frame; and
    transmitting the frame to one or more devices.

2. The method of claim 1, wherein generating the preamble portion comprises setting the second subcarriers that correspond to the busy channel to null values for at least a portion of the preamble portion.

3. The method of claim 1, wherein generating the preamble portion comprises duplicating the legacy preamble on the busy channel within the preamble portion, and wherein the channel bonding indicator is signaled via a resource allocation.

4. The method of claim 1, comprising:
selecting one of the acquired channels as a primary channel, wherein sensing the group of channels comprises monitoring for traffic on each channel of the group of channels.

5. The method of claim 1, comprising:
causing to be unused one or more third subcarriers that correspond to an edge region of the acquired channels to minimize interference to the busy channel, wherein the edge region is adjacent to the busy channel in a frequency domain.

6. The method of claim 1, comprising:
generating a clear channel assessment indication that indicates each channel of the group of channels that is busy.

7. The method of claim 1, wherein the busy channel is in between the acquired channels such that the acquired channels form a non-continuous channel grouping.

8. An apparatus comprising:
an interface to access a wireless medium; and
processor electronics coupled with the interface, wherein the processor electronics are configured to:
control sensing of a group of channels for a channel contention operation that acquires two or more channels of the group of channels and detects a busy channel of the group of channels;
based on the channel contention operation, determine a channel bonding indicator that signals which ones of the group of channels are component channels;
generate a preamble portion of a frame that includes the channel bonding indicator;
generate a data portion of the frame; and
control, via the interface, a transmission of the frame to one or more devices,
wherein the processor electronics are configured to duplicate a legacy preamble on each of the acquired channels within the preamble portion,
wherein the processor electronics are configured to set first subcarriers that correspond to the acquired channels to data values within the data portion, and
wherein the processor electronics are configured to set second subcarriers that correspond to the busy channel to null values for at least a portion of the data portion of the frame.

9. The apparatus of claim 8, wherein the processor electronics are configured to set the second subcarriers that correspond to the busy channel to null values for at least a portion of the preamble portion.

10. The apparatus of claim 8, wherein the processor electronics are configured to duplicate the legacy preamble on the busy channel within the preamble portion, and wherein the channel bonding indicator is signaled via a resource allocation.

11. The apparatus of claim 8, wherein the processor electronics are configured to select one of the acquired channels as a primary channel, and wherein the sensing comprises monitoring for traffic on each channel of the group of channels.

12. The apparatus of claim 8, wherein the processor electronics are configured to cause to be unused one or more third subcarriers that correspond to an edge region of the acquired channels to minimize interference to the busy channel, and wherein the edge region is adjacent to the busy channel in a frequency domain.

13. The apparatus of claim 8, wherein the channel bonding indicator is included in a channel bonding and bandwidth indicator of the preamble portion of the frame.

14. The apparatus of claim 13, wherein the processor electronics are configured to select channel configurations for channel bonding, and control a transmission of information about the selected channel configurations to enable a device to properly interpret the channel bonding and bandwidth indicator.

15. The apparatus of claim 8, wherein the processor electronics are configured to generate a clear channel assessment indication that indicates each channel of the group of channels that is busy.

16. The apparatus of claim 8, wherein the busy channel is in between the acquired channels such that the acquired channels form a non-continuous channel grouping.

17. An apparatus comprising:
an interface to access a wireless medium; and
processor electronics coupled with the interface, wherein the processor electronics are configured to:
receive a frame via a group of channels associated with the wireless medium, the group of channels including two or more used channels and a busy channel, the frame comprising a first preamble portion, a second preamble portion, and a data portion, the first preamble portion comprising a channel bonding and bandwidth indicator that signals which ones of the group of channels are component channels, the first preamble portion comprising a legacy preamble duplicated on each of the used channels,
use the channel bonding and bandwidth indicator to determine the used channels of the group of channels and to decode the second preamble portion via the used channels, the used channels being used within the frame to carry data and preamble information,
determine whether to decode at least a portion of the data portion based on the second preamble portion, and
decode at least the portion of the data portion.

18. The apparatus of claim 17, wherein the second preamble portion and the data portion span the group of channels including the busy channel, and wherein the data portion is generated by (i) setting first subcarriers that correspond to the used channels to data values, and (ii) setting second subcarriers that correspond to the busy channel to null values for at least a portion of the data portion of the frame.

19. The apparatus of claim 17, wherein the processor electronics are configured to receive information about a group of channel configurations, in a communication prior to the frame, to enable the apparatus to properly interpret the channel bonding and bandwidth indicator.

20. The apparatus of claim 17, wherein the busy channel is in between the used channels such that the used channels form a non-continuous channel grouping.

* * * * *